Dec. 22, 1942.   J. P. LUDWIG   2,305,885
WIDENED KNITTED FABRIC AND IN THE PRODUCTION THEREOF
Filed Jan. 17, 1941   5 Sheets-Sheet 2
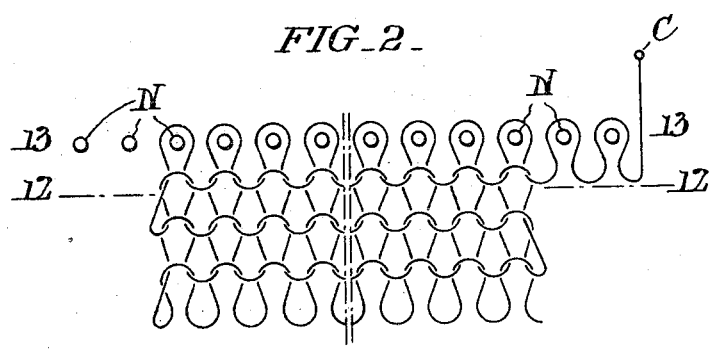
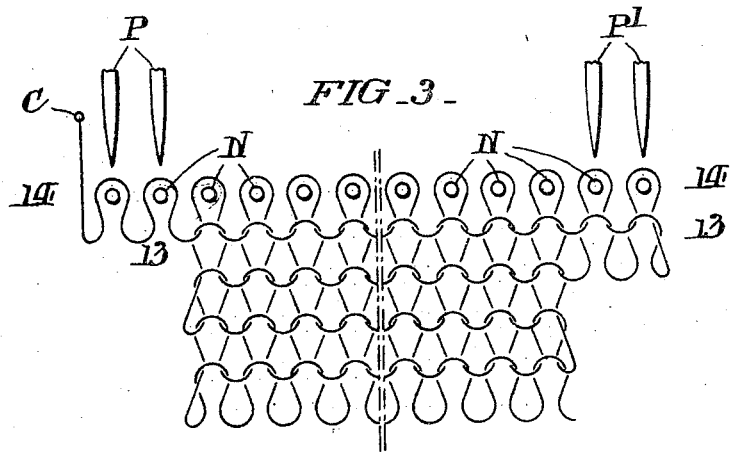
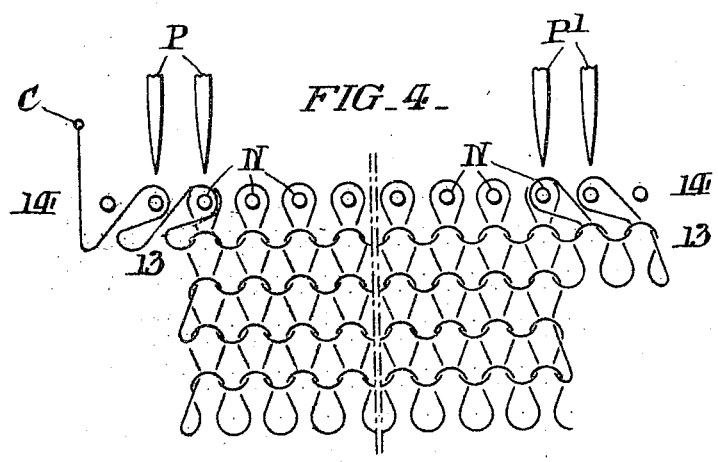
INVENTOR:
Johannes Paul Ludwig,
BY
ATTORNEYS.

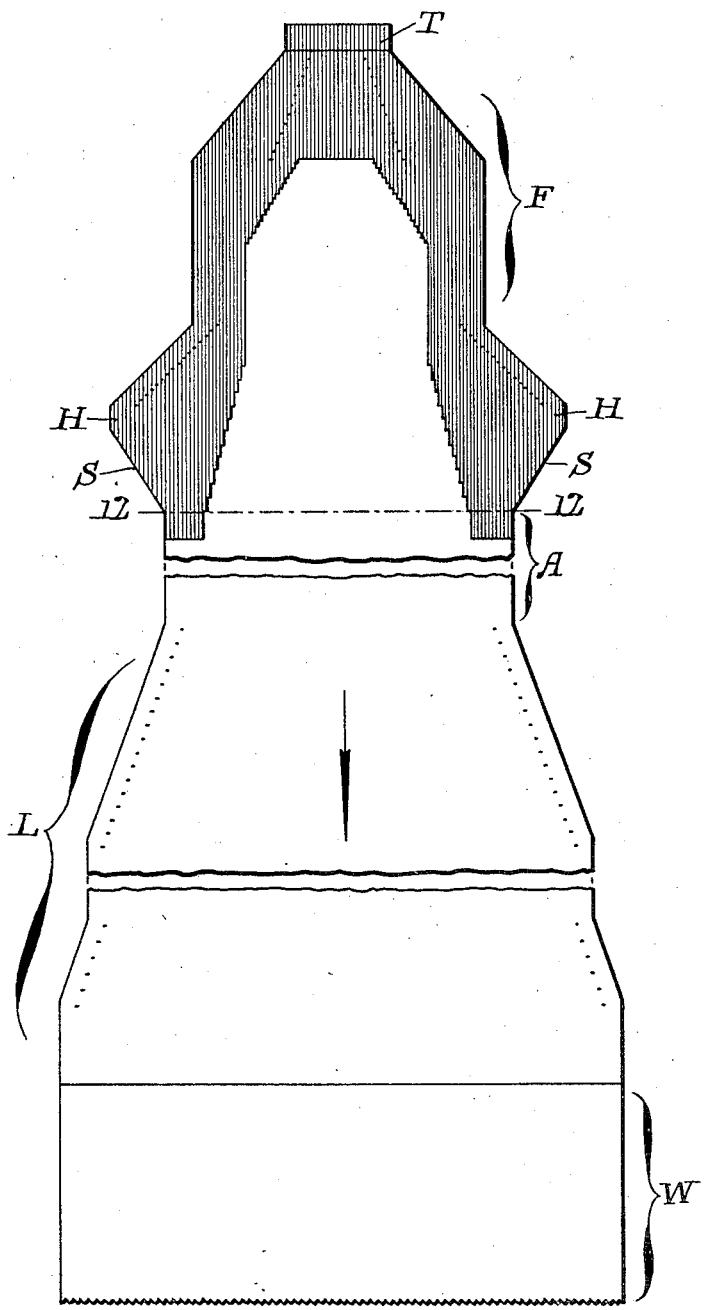

Dec. 22, 1942.  J. P. LUDWIG  2,305,885
WIDENED KNITTED FABRIC AND IN THE PRODUCTION THEREOF
Filed Jan. 17, 1941  5 Sheets-Sheet 3
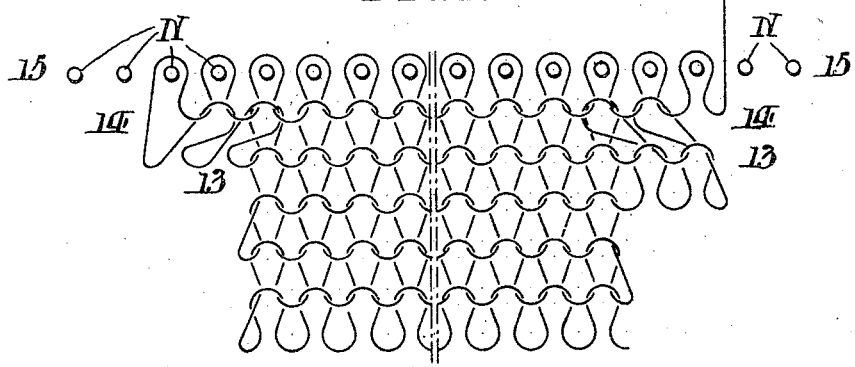
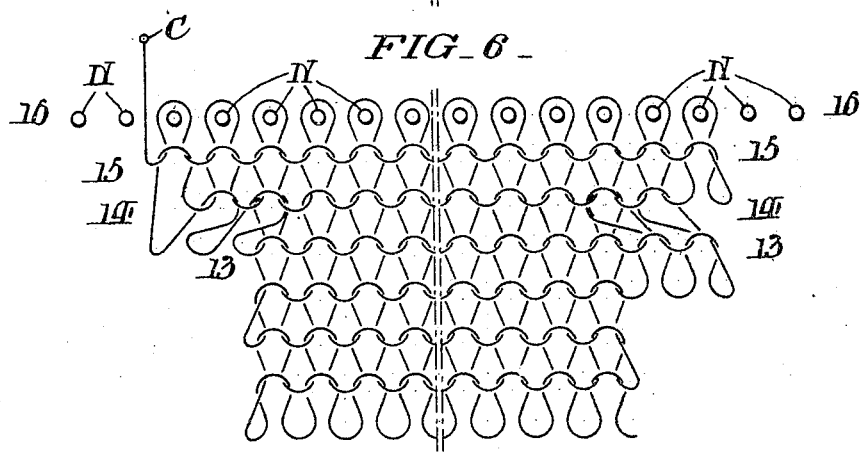
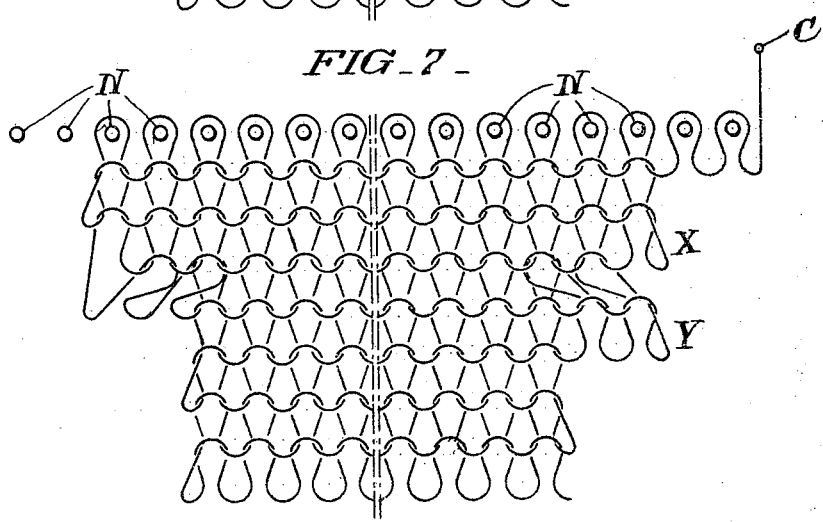

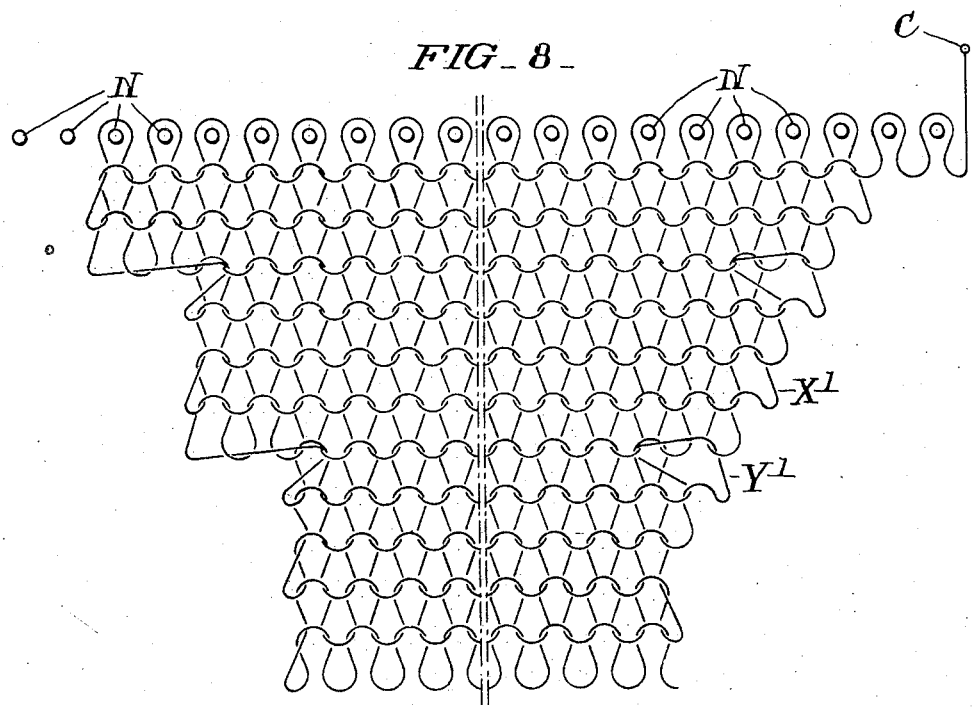
FIG_8_
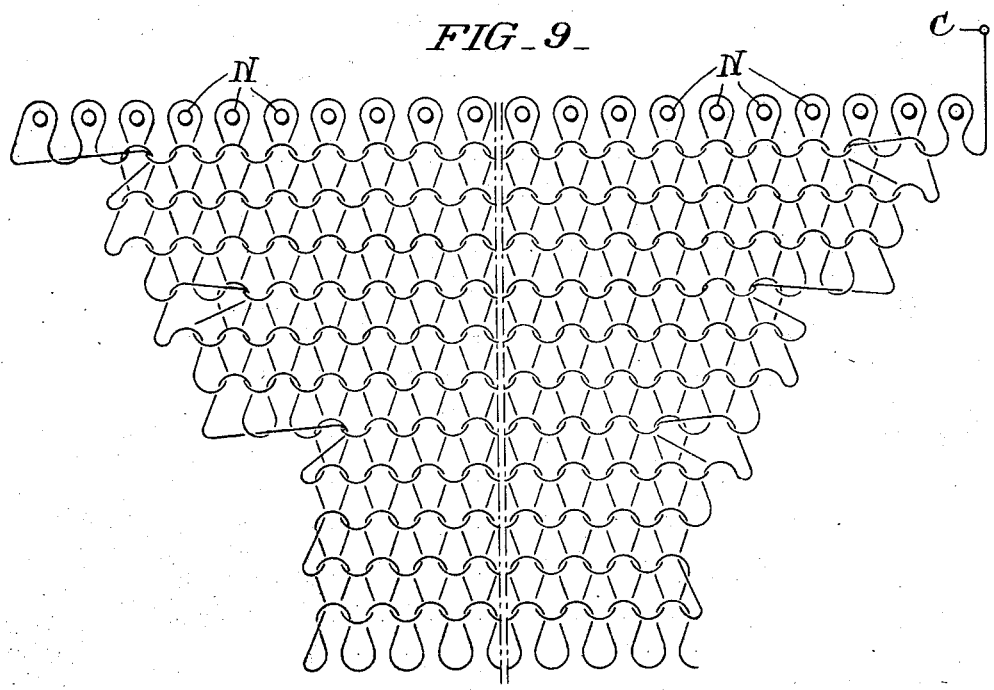
FIG_9_

Dec. 22, 1942.   J. P. LUDWIG   2,305,885
WIDENED KNITTED FABRIC AND IN THE PRODUCTION THEREOF
Filed Jan. 17, 1941   5 Sheets-Sheet 5
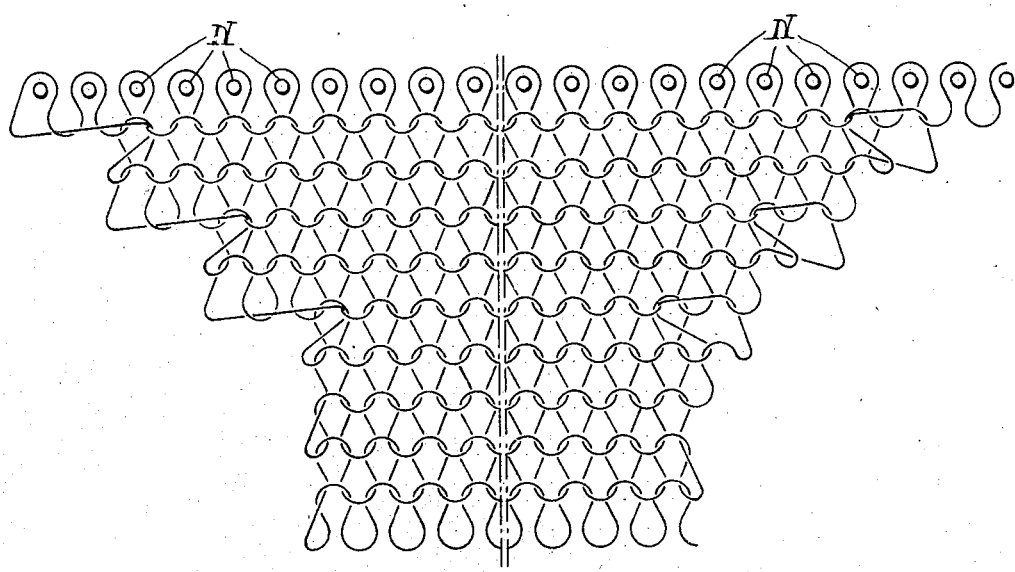
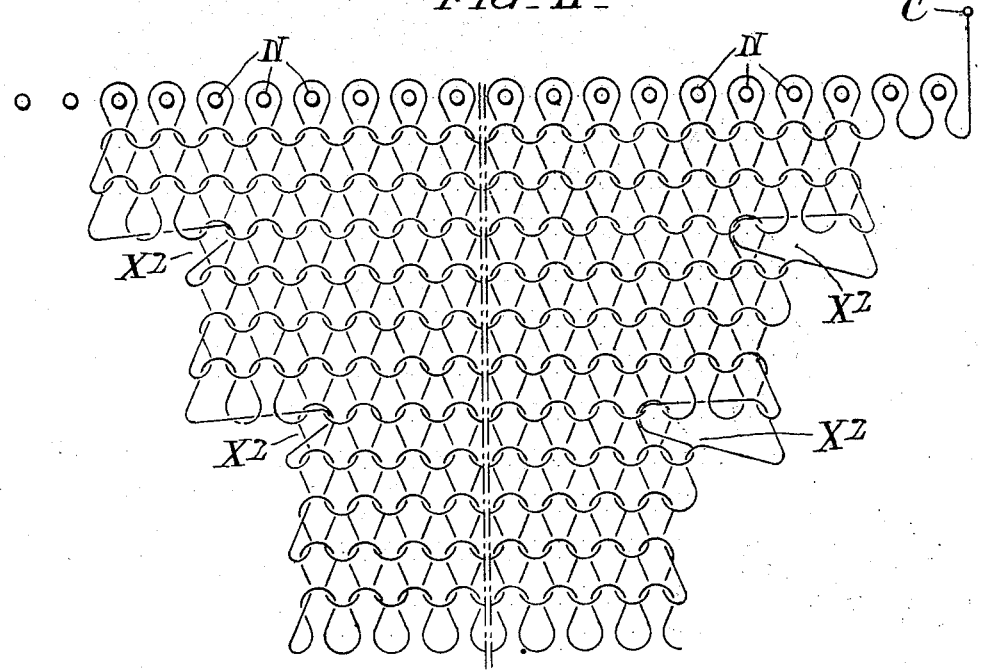

Patented Dec. 22, 1942

2,305,885

UNITED STATES PATENT OFFICE 2,305,885

WIDENED KNITTED FABRIC AND IN THE PRODUCTION THEREOF

Johannes Paul Ludwig, Milwaukee, Wis., assignor to Phoenix Hosiery Company, Milwaukee, Wis., a corporation of Wisconsin Application January 17, 1941, Serial No. 374,825

15 Claims. (Cl. 66—187)

This invention relates to widened knitted fabrics, and also to methods of producing such fabrics.

My invention has for its aim to enable, during the production of widened knitted fabric, the formation of selvages which are devoid of sleeziness and which are locked against the possibility of subsequent ravelling.

Selvages having these attributes are particularly advantageous and desirable in connection with the production of flat blanks of continuously knit stockings of the type wherein the upper portions of heels are shaped by widening, and wherein the selvages must be capable of withstanding manipulation in sewing machines without undergoing ravelling incident to being seamed together to complete the stockings.

In the attached drawings, Fig. 1 is a broken out view showing a flat continuously-knit flat fashioned stocking blank with widened upper heel portions conveniently embodying my invention.

Figs. 2, 3, 4, 5, 6 and 7, are diagrammatic views showing successive steps in the formation of the widened heel portions of the blank.

Fig. 8 is a view corresponding to Fig. 7 but showing the actual appearance of the selvages in the finished blank.

Figs. 9, 10 and 11, are views in turn like Fig. 8, showing alternative forms of my invention.

In Fig. 1 it is to be understood that the stocking blank is knitted as a continuous or one piece structure in the direction of the arrow, starting at the welt W and ending with the toe tip T. The leg L may be shaped as ordinarily by narrowing down to a uniform width ankle portion A. Beginning at the course 12, 12, the upper halves of the heel portions H are shaped by widening with incidental formation of selvages at S, S, in accordance with my invention. After the widening has been carried out to the desired extent, the width of the fabric is maintained uniform for a few courses as shown, whereupon the lower halves of the heel portion are shaped by narrowing, the latter step being followed by the completion of the remainder of the foot F in any approved manner. After the more or less usual practice, the foot of the stocking blank may be reinforced in the area which is line-shaded in Fig. 1.

Reference will now be had to Figs. 2-8 which show how the widened heel portions H of the stocking of Fig. 1 are formed by my improved method, and wherein the needles of a flat producing machine (which may be of the well known "Cotton" type) are designated by the letter N, one of the yarn carriers by the letter C, and the left and right hand groups of transfer points by the characters P and P¹.

In Fig. 2, after knitting of the course 12, 12, a succeeding widened course 13, 13 is formed by traverse of the yarn carrier C to the right with an increase in its movement to supply yarn to two additional end needles. Thereupon the carrier C is moved to the left as shown in Fig. 3 to form a second widened course 14, 14 with addition of two end loops at the opposite edge of the fabric. With this accomplished, the points P, P¹ are brought into operation as in Fig. 3 to simultaneously engage the added loops at each edge of the fabric, and to transfer said loops inwardly, respectively as in Fig. 4, to the next adjacent needles. This is followed by the formation of two courses 15, 15 and 16, 16 without increase in the traverse of the carrier C as shown in Figs. 5 and 6 to complete the widening cycle which is again initiated in Fig. 7 and continuously repeated until the desired shaping of the upper heel portions of the stocking blank is attained. It will of course be understood that since the loops at X and Y in Fig. 7 are left unsupported upon retraction of the sinkers (not illustrated) of the machine, they will be drawn out by the action of the fabric take-up and assume the form shown at X¹, Y¹ in Fig. 8. Notwithstanding this, however, it will be seen that said loops are effectively locked against ravelling.

The modified fabric shown in Fig. 9 is made in the same way as described above except in that the widening is carried out every three courses instead of every four courses.

The alternative form of fabric featured in Fig. 10 is also like that of Fig. 8 with the difference that the widening occurs in every second course.

Fig. 11 shows still another modification in which only the inner of the two added loops in each widened course is transferred inward and doubled with the next adjacent loop in such course as at X². While in Fig. 11 the widening occurs every fourth course as in Figs. -7, the rate or frequency may be varied as in the fabrics of Figs. 9 and 10.

Having thus described my invention, I claim:

1. Knitted fabric characterized by having, at intervals of its length, widened courses with added end loops, and by having individual added loops in such courses doubled with individual inwardly adjacent loops in said courses.

2. Knitted fabric characterized by having, at intervals of its length, widened courses with plural added end loops, and by having individual added end loops in such courses doubled respectively with individual inwardly adjacent loops in said courses.

3. Knitted fabric characterized by having, at intervals of its length, widened courses with plural added end loops, and by having one of the added end loops in each course doubled with an inwardly-adjacent loop in said course.

4. Knitted fabric in the form of a flat fashioned stocking blank characterized by having widened upper heel portions with courses at intervals of their lengths containing added end loops, and by having individual added end loops in such courses doubled with individual inwardly adjacent loops in said courses.

5. Knitted fabric in the form of a flat fashioned stocking blank characterized by having widened upper heel portions with courses at intervals of their lengths containing plural added end loops, and by having individual added end loops in such courses doubled with individual inwardly adjacent loops in said courses.

6. Knitted fabric in the form of a flat fashioned stocking blank characterized by having widened upper heel portions with courses at intervals of their lengths containing plural added end loops, and by having one of the added end loops in each course doubled with an inwardly adjacent loop in said course.

7. The method of producing widened knitted fabric which comprises adding loops to the ends of certain courses periodically during the knitting; and inwardly transferring individual added loops in such courses and doubling them with individual adjacent loops in said courses before knitting the immediately succeeding courses.

8. The method of producing widened knitted fabric which comprises adding plural loops to the ends of certain courses periodically during the knitting; and inwardly transferring certain individual added loops in said courses and doubling them respectively with individual adjacent loops in such courses before knitting the immediately succeeding courses.

9. The method of producing widened knitted fabric which comprises adding plural loops to the ends of certain courses periodically during the knitting; and inwardly transferring one of the added loops in each course and doubling it with an adjacent loop in said course before knitting a succeeding course.

10. Knitted fabric characterized by having at intervals of its length, widened courses with added end loops, and by having individual added end loops in such courses doubled with laterally adjacent individual loops of the fabric.

11. Knitted fabric characterized by having at intervals of its length, widened courses with plural added end loops, and by having individual added end loops in such courses doubled respectively with individual laterally adjacent loops of the fabric.

12. A flat knitted stocking blank having widened upper heel portions characterized as in claim 10.

13. A flat knitted stocking blank having widened upper heel portions characterized as in claim 11.

14. The method of producing widened knitted fabric by adding plural loops to the ends of certain courses, and laterally transferring individual added loops in such courses and doubling them with individual laterally adjacent loops of the fabric.

15. The method of producing widened knitted fabric by adding plural loops to the ends of certain courses, and laterally transferring individual added loops in such courses inwardly and doubling them with individual laterally adjacent loops of the fabric.

JOHANNES PAUL LUDWIG.